United States Patent
Barnes et al.

(10) Patent No.: US 6,975,925 B1
(45) Date of Patent: Dec. 13, 2005

(54) FORECASTING AN ENERGY OUTPUT OF A WIND FARM

(75) Inventors: David L. Barnes, Alpine, CA (US); Ruben Juarez, Chula Vista, CA (US); John Wade, Portland, OR (US)

(73) Assignee: Windlynx Systems, B.V., San Diego, CA (US)

( * ) Notice: Subject to any disclaimer, the term of this patent is extended or adjusted under 35 U.S.C. 154(b) by 359 days.

(21) Appl. No.: 10/393,703

(22) Filed: Mar. 19, 2003

Related U.S. Application Data

(60) Provisional application No. 60/366,031, filed on Mar. 19, 2002.

(51) Int. Cl.[7] .................................................. H02J 1/14
(52) U.S. Cl. ....................................... 700/286; 700/287
(58) Field of Search ................................ 700/286, 287, 700/290, 291, 297; 702/3, 60

(56) References Cited

U.S. PATENT DOCUMENTS

| | | | |
|---|---|---|---|
| 2002/0029097 A1 * | 3/2002 | Pionzio et al. ............... | 700/286 |
| 2003/0105556 A1 * | 6/2003 | Enis et al. ................... | 700/286 |

OTHER PUBLICATIONS

Murato, "3 Neurall Networks in Load Forecasting", Jan. 5, 1998.*

Li et al. "Using Neura Networks to Estimate Wind Turbine Power Generation", Sep. 2001, IEEE vol. 16, No. 3 pp 276-282.*

Li et al. "COmparative Analysis of Regression and Artificial Neural Network Models for Wind Turbine Power Curve Estimation" Nov. 2001, ASME, vol. 123 pp. 327-332.*

Alexiadis et al., "Wind SPeed and Power Forecasting based on Spatial COrrelation Models", Sep. 1999, IEEEvol. 14 No. 3 pp 836=-842.*

Kariniotakis et al., Wind Power Forecasting Using Advanced Neural Networks Models, Dec. 1996, IEEE vol. 11 No. 4 pp 762-385.*

* cited by examiner

*Primary Examiner*—Albert W. Paladini
*Assistant Examiner*—Chad Rapp
(74) *Attorney, Agent, or Firm*—Fish & Richardson P.C.

(57) ABSTRACT

Methods and apparatus for forecasting an energy output of a wind farm. A method for forecasting an energy output of a wind farm includes maintaining a data base of wind patterns, each wind pattern being associated with an energy output that the wind farm produces. The method includes receiving a current wind pattern. The method includes searching the data base for a wind pattern that matches the current wind pattern. The method includes calculating a forecast energy output that the wind farm will produce in response to the current wind pattern, the calculation being based, when there is a matching wind pattern in the knowledge base, on the energy output associated with the matching wind pattern.

16 Claims, 5 Drawing Sheets

FORECASTING AN ENERGY OUTPUT OF A WIND FARM

This application claims the priority of U.S. Provisional Application Ser. No. 60/366,031, filed Mar. 19, 2002, which is hereby incorporated by reference in its entirety.

BACKGROUND OF THE INVENTION

The present invention relates to commercial electric power generation.

Wind energy is an important energy source for utility companies ("utilities") throughout the world. A wind farm of wind turbines operated for commercial electric power generation harvests wind energy and converts the harvested wind energy into electric power. The generated electric power, i.e., the wind farm's energy output, is then distributed to utility companies. As the electric power generated by the wind farm becomes a greater share of a utility company's resource stack, it is necessary to predict the energy output of the wind farm so that a wind farm operator can meet the varying demand for electric power. Utilities receiving electric power from the wind farm are thus requiring forecasts of energy output from the wind farm operator. The time period of interest for forecasts varies from hourly forecasts for dispatching and scheduling to one-day or two-day forecasts for spot market purchases and sales.

Generally, a conventional forecast system uses regional weather forecasts and the capacity of the wind turbines of the wind farm to forecast the energy output of the wind farm. Regional weather forecasts provided to wind farm operators are based on model output statistics. Typically, the model is a set of multiple regression equations that need to be updated as independent variables and dependent variables change. Examples of changes in variables include improvements to regional forecasts models or changes in the wind farm such as changes in the number of turbines, turbine availability, and turbine performance.

SUMMARY OF THE INVENTION

The present invention provides methods and apparatus, including computer program products, for forecasting an energy output of a wind farm by associating energy outputs of a wind farm with wind conditions local to the wind farm. A wind condition, which is a meteorological phenomena, can be represented by a wind pattern, which is data that describes the wind condition it represents.

In general, in one aspect, the invention provides a method for forecasting an energy output of a wind farm includes maintaining a database of wind patterns. Each wind pattern is associated with a corresponding value of energy output that the wind farm produces. Such values will be referred to in this specification as energy output values. The method includes receiving a current wind pattern. The method includes searching the database for a wind pattern that matches the current wind pattern. The method includes calculating a prediction of the energy output that the wind farm will produce in response to the current wind pattern when there is a matching wind pattern in the database. The calculation is based on the energy output value associated with the matching wind pattern.

Particular implementations can include one or more of the following features. Maintaining a knowledge base of wind patterns includes receiving and storing wind patterns and corresponding energy output values. Received wind patterns and corresponding energy output values that are erroneous as detected by tests such as a range test, a relational test, and a trend test. Detected erroneous wind patterns and energy output values are not used to forecast the energy output of the wind farm.

Received wind patterns can be grouped. Wind patterns are grouped such that wind patterns in the same group represent wind conditions that will cause the wind farm to produce the same or substantially the same energy output. Accordingly, wind patterns in a group are associated with a common energy output value. There can be different categories of wind patterns. Each category includes its own set of rules for determining how to group the wind patterns that falls into the category. That is, the rules determine how many wind patterns to associate with each energy output value. The grouping can be performed by a neural network. The neural network groups wind patterns by giving them the same label.

A forecast of energy output can include a probability that the wind farm will produce the forecast energy output. The accuracy of a forecast of energy output is improved by receiving and applying additional and independent information. Additional information includes the actual energy output. Applying the additional information includes updating the probability that the wind farm will produce the forecasted energy output. The additional information includes a high-resolution regional weather forecast.

In general, in another aspect, the invention provides a computer program product that is tangibly stored on a machine-readable medium and that is for forecasting an energy output of a wind farm. The product includes instructions operable to cause a programmable processor to maintain a database of wind patterns. Each wind pattern is associated with a corresponding energy output value. The product includes instructions to cause a programmable processor to receive a current wind pattern. The product includes instructions to cause a programmable processor to search the database for a wind pattern that matches the current wind pattern. The product includes instructions to cause a programmable processor to calculate the energy output that the wind farm produces for the current wind pattern when there is a matching wind pattern in the database. The calculation is based on the energy output value associated with the matching wind pattern.

The invention can be implemented to realize one or more of the following advantages. A system in accordance with the invention requires no external manipulation of proprietary and sensitive wind farm information such as the capacity of wind turbines. The wind farm operator never needs to provide sensitive wind farm information to an external forecasting service.

The system cleanses internal data and ensures that quality data is used in forecasts. Wind farm meteorological tower data, turbine mounted anemometer data, and turbine power output are all subject to error. A set of screening criteria based on range test, relational test, and trend tests remove erroneous data from input data used to forecast energy output.

Forecasts include use of upwind sensors that act as sentries and allow adaptive logic for forecasting. Forecasts are self-improving. The system uses regional forecast model information from external forecasting services such as eWind, available from TrueWind Solutions, L.L.C. of Albany, N.Y. The relationships between this input and the system are internal and the system automatically adjusts its logic to improve its forecasts of energy output.

The system can include neural networks and can apply Bayesian logic. The system can thus account for sophisticated inter-relationships between weather parameters that describe a wind pattern. Furthermore, use of neural networks and Bayesian logic allows the system to improve the accuracy of its forecasts, on the fly, as more information, such as better regional forecasts, becomes available.

The system bases its forecasts on empirical data. Such forecasts are superior to those using numerical models that predict individual turbine output, because model error is not being introduced to the forecast.

The system categorizes wind patterns and, thus, simplifies the development of statistical relationships between wind patterns and energy output values. Each category includes its own set of rules for categorizing wind patterns. In one implementation, there are four main categories of wind patterns. One category describes wind speeds that cause a wind turbine to cut-in. A second category describes wind speeds ranging from that which causes the wind turbine to cut-in up to that which causes the wind turbine to operate at its rated performance. Another category describes wind speeds that cause the turbine to operate at rated performance. A fourth category describes wind speeds that are too high and cause the wind turbine to cut-out. An additional four domains represent transition zones of each main category. The categories of wind patterns are further described below.

The system includes a decision analysis supporting both probabilistic forecasts and decision criteria and, thus, allows decision makers include preferences, costs, uncertainty, and various levels of risk aversion in forecast based decision-making. Each forecast of energy output includes expected output, maximum possible, minimum possible, and forecast confidence level in percent.

The system incorporates forecasting into power generation operations. There are significant benefits to having an operational system that incorporates forecasting. These benefits include the following ones. Utilities place a higher value on electric power generated from wind energy if such electric power can reliably meet its predicted output. Purchasers will increase their use of wind energy and raise the capacity payments. Avoidance of energy imbalance charges is a significant benefit in the Pacific Northwest where the Bonneville Power Administration can impose penalties for producing less or more than the forecast energy output. An operator of a wind farm can maximize the value of the wind farm's energy output by anticipating purchases required to meet projected energy output when there is less wind energy than expected. Wind farm operators can purchase energy on the spot market to shape and firm the wind farm output or fulfill contractual sales obligations. Turbine and substation maintenance can be scheduled to avoid periods when the wind is sufficient for operation thus reducing lost operating hours and wind farm revenue. Efficient scheduling maintenance periods, for example, those that require the use of a crane, can save a wind farm operator significant costs. Operations of the wind farm can be improved by using control strategies that optimize wind farm output by shutting down every other turbine during inline flow conditions. Damage can be minimized when operation staff is aware of extreme wind conditions. An Internet Web site that provides current wind farm output, forecasted output, and error between predicted and observed output can provide customer or investor information.

The details of one or more implementations of the invention are set forth in the accompanying drawings and the description below. Other features and advantages of the invention will become apparent from the description and the drawings.

BRIEF DESCRIPTION OF THE DRAWINGS

Like reference numbers and designations in the various drawings indicate like elements.

DETAILED DESCRIPTION

A Method for Forecasting the Energy Output of a Wind Farm

Figure 1:
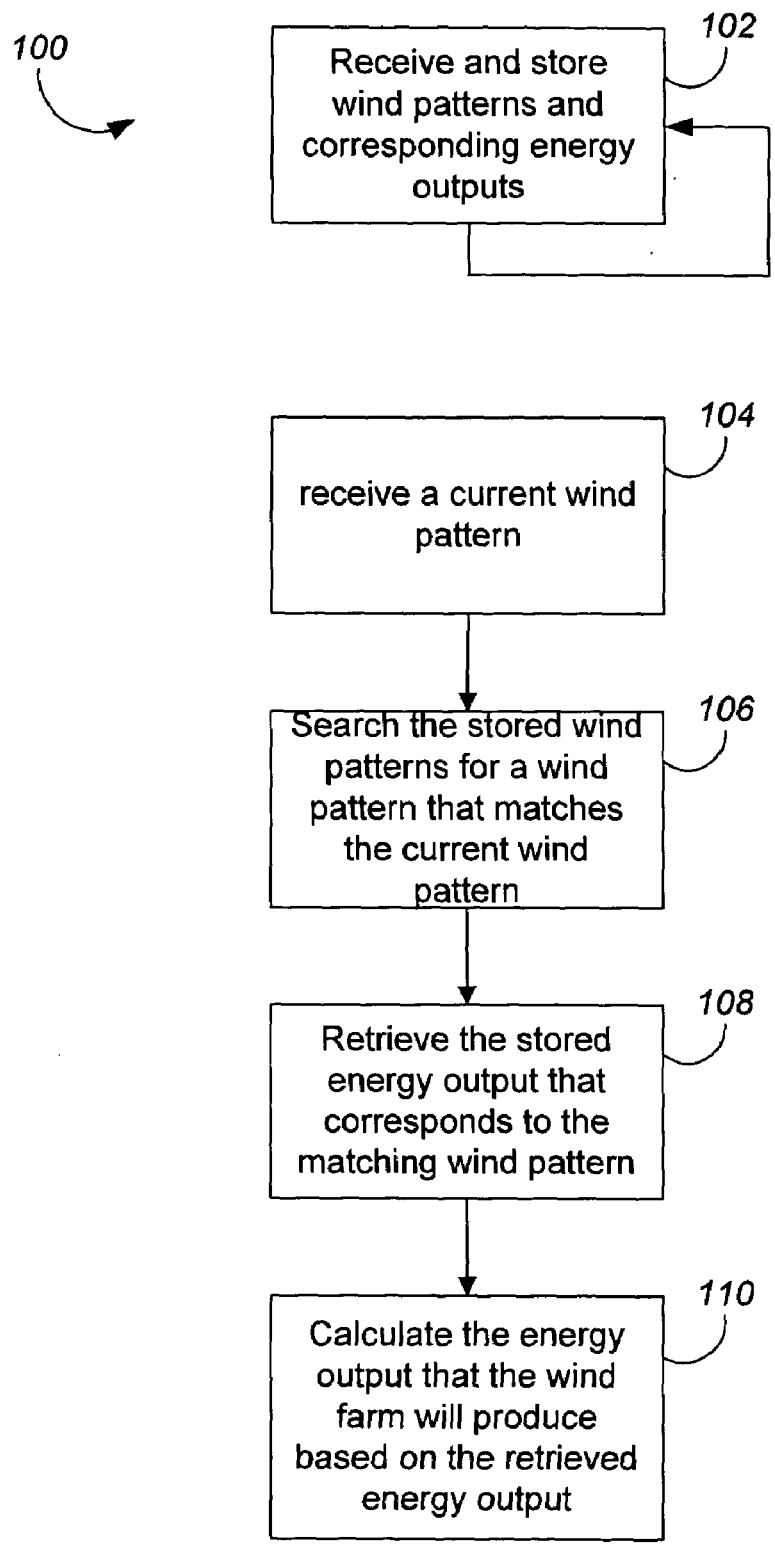
FIG. 1 shows a method in accordance with the invention for forecasting the energy output of a wind farm.

FIG. 1 shows a method in accordance with the invention for forecasting the energy output of a wind farm. A system in accordance with the invention receives wind patterns and corresponding energy output values and stores the received wind patterns and corresponding energy output values in a database (step 102). A wind pattern describes a local wind condition, such as wind speed, ambient temperature, wind direction, and ambient pressure, over a geographic area such as the area of the wind farm. The wind pattern is represented by values of the wind speed and direction, ambient pressure, and ambient temperature. Alternatively, the system can use any combination of weather parameters to represent the wind pattern. The system can store the weather parameters in any form, including a string of bits or an alphanumeric character string. The wind patterns can be measured with instruments, such as, for example, anemometers, thermometers, and barometers located on each wind turbine of the wind farm. An energy output value is data that specifies the energy output that the wind farm produces. The energy output value associated with a wind pattern describes the energy output the wind farm produces in response to wind conditions described by the wind pattern. The energy output value associated with a wind pattern can specify the energy output that the wind farm produces at other times relative to when the wind pattern occurs, such as one hour after the wind pattern occurs. The energy output values can be obtained by measuring the energy outputs with current and voltage sensors located at each turbine.

The system receives a current wind pattern (step 104). The current wind pattern represents a particular wind condition over the wind farm. The system searches the stored wind patterns for a wind pattern that matches the current wind pattern (step 106). The system optionally includes modifiable rules that define a match. When there is a match, the system retrieves the stored energy output that corresponds to the matching wind pattern (step 108). If there are more than one matching wind pattern and the corresponding energy outputs are not the same, then the system retrieves the stored energy output of the best match. The system calculates the energy output that the wind farm will produce as a result of the current wind condition (step 110). The calculation is based on the retrieved energy output.

A System for Forecasting the Energy Output of a Wind Farm

Figure 2:
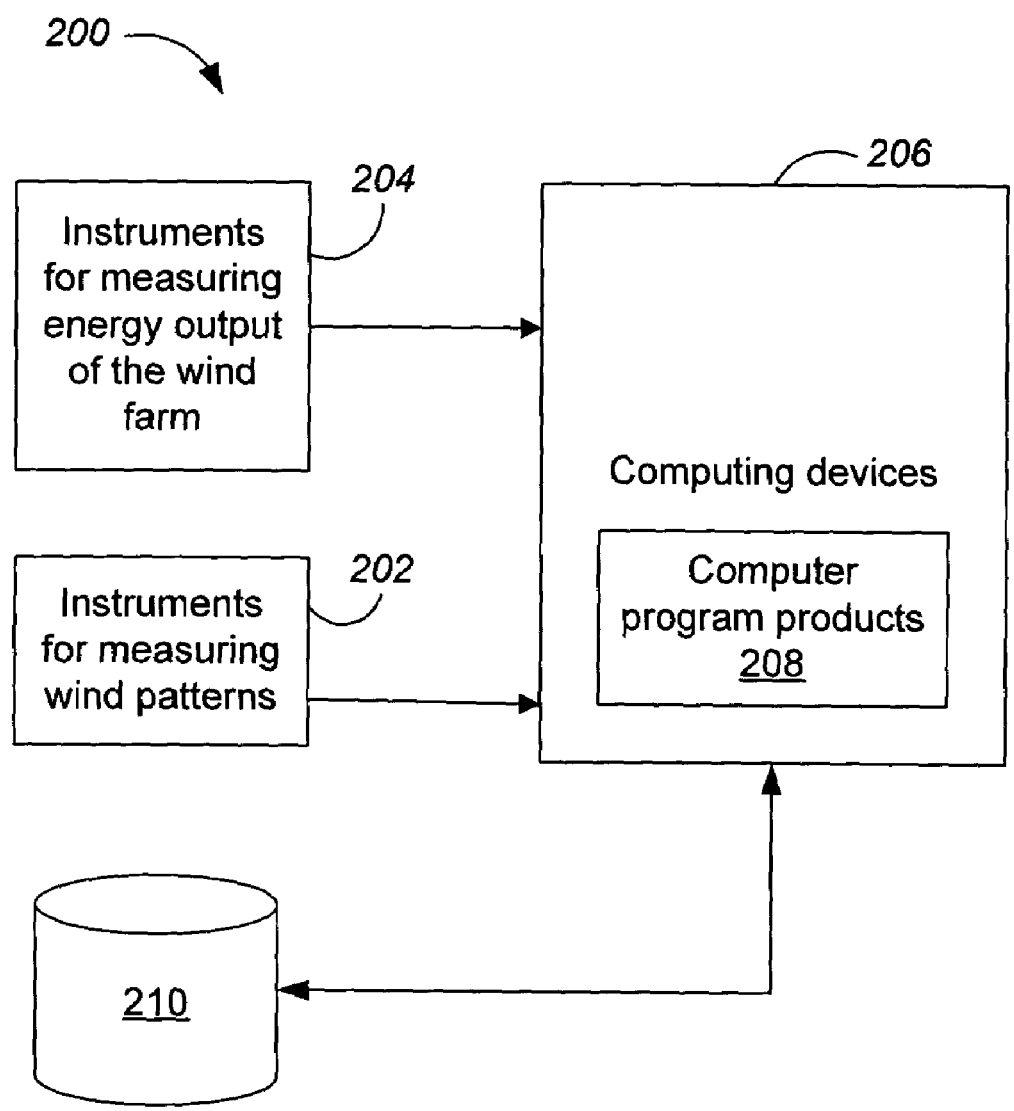
FIG. 2 shows system in accordance with the invention for forecasting the energy output of a wind farm.

FIG. 2 shows a system 200 in accordance with the invention. The system 200 includes instruments 202 for measuring wind patterns. The instruments 202 include instruments for measuring wind speed, ambient temperature, and ambient pressure. The instruments 202 include any combination of anemometers, thermometers, and barometers. The system 200 includes instruments 204 for measuring the energy output of a wind farm. The system 200 includes computing devices 206 and computer program products 208 that record and process wind patterns occurring over, and energy outputs of, the wind farm. The computing devices 206 and computer program products 208 also perform the wind pattern matching and energy output calculation. Alternatively, the system 200 includes separate computing devices and computer program products for matching wind patterns and calculating energy output. The system 200 optionally includes a database 210 for storing wind patterns and corresponding energy outputs.

An Implementation

Figure 3:
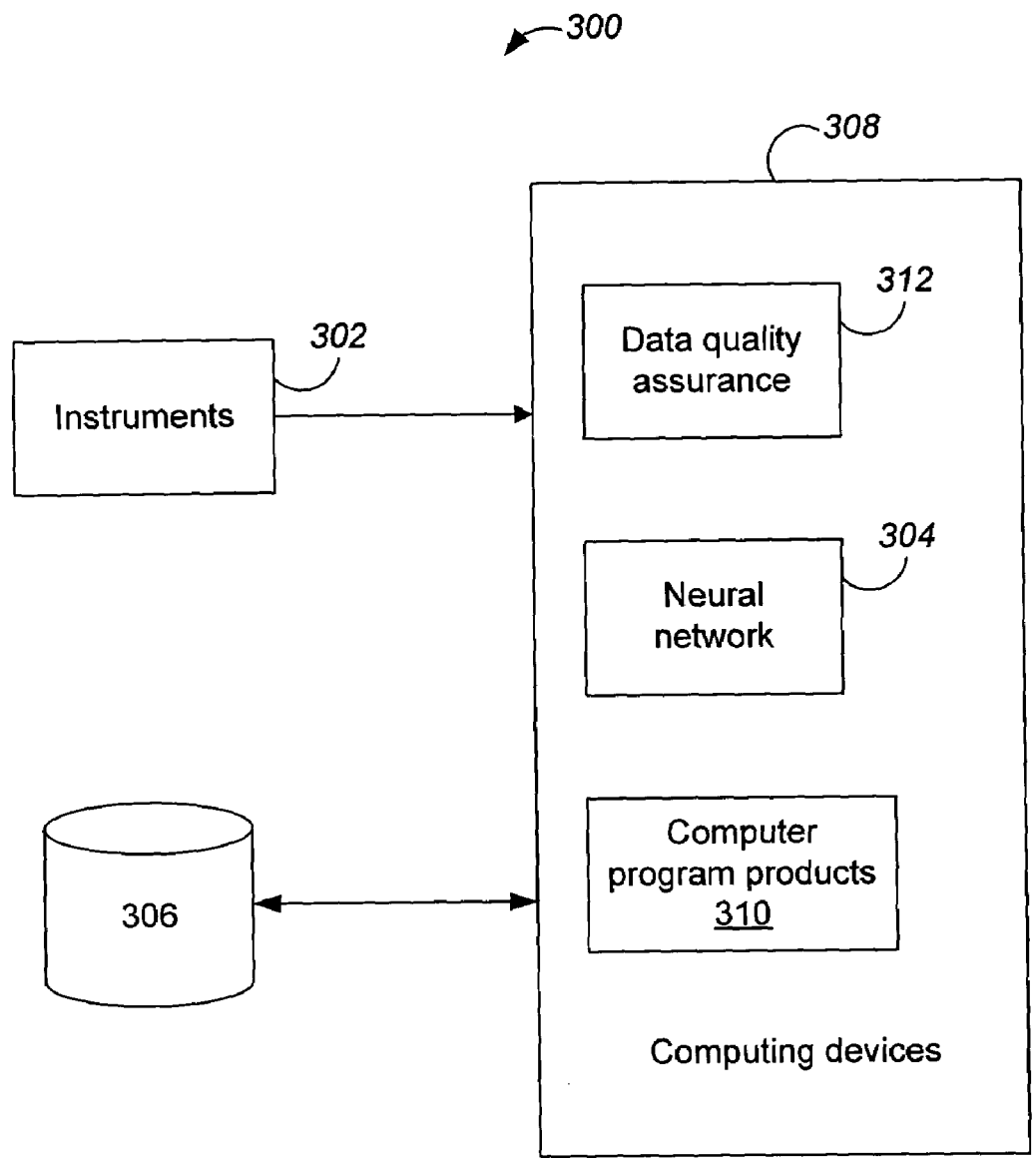
FIG. 3 shows one implementation of a system for forecasting the energy output of a wind farm.

Forecasting wind farm energy output is difficult because the wind, which determines energy output, varies widely in both time and space. However, wind conditions do exhibit dependence from hour to hour and from location to location. This dependence is sometimes called trend for temporal dependence and patterns for spatial dependence. FIG. 3 shows a system 300, which is one implementation of the system 200. The system 300 accounts for both the variability and the dependence in a probabilistic model.

The system 300 includes instruments 302 that measure wind speed and energy output for each turbine of a wind farm. The system 300 includes a neural network 304 that is a variation of the Perceptron. The neural network 304 takes as input a wind pattern and derives a bit string from the wind pattern. When properly calibrated, the neural network 304 will derive the same bit string for wind patterns representing wind conditions that causes the wind farm to produce the same or similar energy outputs. That is, the neural network 304 groups the wind patterns. Wind patterns of a group has the same bit string. The system 300 includes a database 306 that stores the described bit strings. The system 300 includes a computing device 308 and computer program products 310 for matching a bit string that the neural network 304 derived from the current wind pattern with a bit string stored in the database. The computing device 308 and products 310 are operable to calculate an energy output that the wind farm will produce as a result of the current wind pattern. The computing device 308 and the computer program products are also operable to receive high-resolution regional weather forecasts. The system also includes a component 312 that removes erroneous data and ensures that the system uses only quality data. These system components are further described below.

The system 300 optionally includes a Supervisory Command and Data Acquisition system for managing wind turbines for electric power generation, such as the one described in U.S. application Ser. No. 09/828,500, which is hereby incorporated by reference in its entirety.

The system 300 provides two types of forecasts, an hourly forecast and a long range forecast. Hourly forecasts provide dispatchers with information on the amount of energy available the next hour to avoid utility-imposed imbalance charges. This forecast is based on input information, such as wind speed trends, collected at the wind farm, from regional models, and from sentry anemometers. An advanced statistical model associates input information, i.e., the wind patterns, with the energy output values of the wind farm. The system uses observed wind conditions and forecasted wind conditions to forecast energy output. The system can include neural networks, pattern recognition logic, and Bayesian logic.

Long range forecasts include six-hour, twelve-hour, one-day, and two-day forecasts. Long range forecasts are needed for sales and scheduling. To enhance its empirically-derived forecasts, the system uses forecasts from regional weather models like those used by the National Weather Service of the United States. However, the system uses regional weather models that have a much higher resolution than the models the National Weather Service uses. For example, the National Weather Service uses models that have a resolution of 40 kilometers. The system uses models, such as MASS or MM5, that have a resolution of 4 kilometers. The forecasts from these models are obtained from external forecasting services such as, for example, eWind and are incorporated into the system's forecast. eWind can provide such models from its Web site. The advantage of the higher resolution is increased accuracy in the prediction of the wind because the model can incorporate more local topography, which has an important impact on local wind speed and direction. The model for the long-range forecast is similar to the short-range forecast except that it is based more on the regional model and less on upwind information.

Measuring Instruments

The system 300 includes a sentry point to anticipate trends. The sentry point includes an anemometer, a thermometer, and a barometer. The sentry point is usually located at a point that is upwind from the wind farm and can be, e.g., a meteorological tower. At each wind turbine of the wind farm, the system 300 includes an anemometer, a thermometer, and a barometer. Also included at each wind turbine are instruments that measure electric power generated by the turbine. When it is not practicable to have a sentry point to measure wind conditions, the system 300 uses a regional weather forecast to provide wind conditions of a point that is upwind to the wind farm. The sentry point provides a clue as to the trend in the wind speed and allows the system to adapt its forecasts according to any detected trends.

Regional Weather Forecasts

Regional weather forecasts having high resolutions, e.g., 4 kilometers, are now reasonably accurate enough to provide real time estimates of the wind and expected wind speeds and direction out to 48 hours. The system 300 receives these inputs to enhance its empirically-derived forecasts.

Data Quality Assurance

The system includes a component 312 for data quality assurance. Any forecast is based heavily on trends and discrete relationships between dependent and independent variables. The component 312 for data quality assurance uses range tests, relational tests, and trend tests to detect erroneous data points, which can include an improperly recorded wind pattern or energy output. The component 312 removes erroneous data points.

Pattern Recognition and the Perceptron

Figure 4:
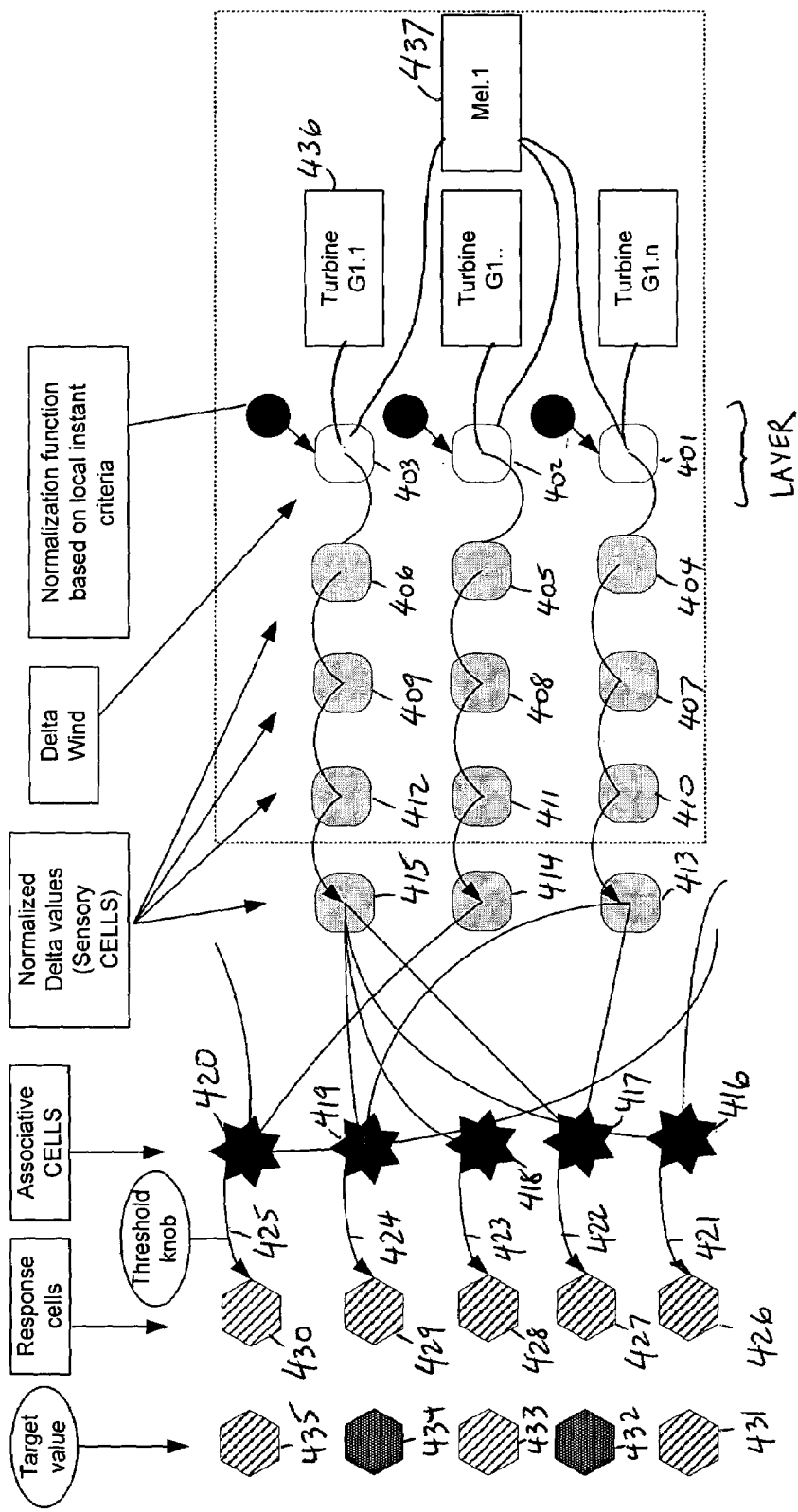
FIG. 4 illustrates a neural network for determining the number of wind patterns to associated with a particular energy output of a wind farm.

FIG. 4 shows an example of the neural network 304. The basic assumption of the system's forecasting model is that patterns of energy output of the wind farm are related in space and time to the wind conditions occurring over the wind farm. These patterns can in turn be analyzed by categorizing the wind patterns that represent the wind conditions into distinct categories. Each category has its own set of rules for ensuring that the neural network will generate the same bit string for different wind patterns representing different wind conditions that will cause the wind farm to produce the same or similar energy output.

A first energy output is similar to a second energy output when their values fall within a certain threshold band. The threshold band can be, for example, 10 percent less or 10 percent greater than the forecast value. The threshold band can be varied to comply with regulations and business interests.

The neural network shown in FIG. 4 includes input cells 401-3, sensory cells 404-415, associative cells 416-420, threshold knobs 421-425, response cells 426-430, and target cells 431-435. Each input cell receives as input wind speeds as measured at its assigned turbine and also at the sentry. For example, the input cell 403 receives wind speeds as measured at the turbine 436 and at the sentry 437. The difference of these wind speeds, i.e., the delta wind, can be calculated. The set of delta wind values recorded for wind turbines of the wind farm at a particular time is one expression of a wind pattern for the wind farm at the particular time. The neural network normalizes each wind pattern received with respect to other wind patterns received and accounts for changes in air density that occur between times when wind patterns are recorded. Normalization is performed using ambient temperature and ambient pressure local to the wind farm.

The sensory cells 404-415 apply the rules mentioned above to the delta wind values stored in the input cells. The sensory cells can apply different rules for different categories of wind. For a particular wind pattern, the only sensory cells that operate are those having rules for the category into which the particular wind pattern falls. Cells having rules for other categories do not operate. Cells applying rules for a category form a layer. Sensory cells 410-403 apply the same rules and are one example of a layer. The number of layers of sensory cells corresponds to the number of categories of wind patterns. The output of the sensory cells are values derived from the input delta winds in accordance to the rules.

The associative cells 416-420 add the derived values of the sensory cells and outputs either a 1 or a 0, depending on whether the added derived values exceeds some threshold value. If the threshold value is exceeded in a sensory cell, then the sensory cell outputs a 1 into the down stream response cell. Otherwise the associative cell outputs a 0 into the down stream response cell. The 0s and 1s in the response cells form a bit string, which the system can encode into a unique binary pattern that corresponds to a unique collection of one or more wind patterns. The unique binary pattern is a representation of the unique collection of the one or more wind patterns. The neural network outputs these calibrated representations at its response cells and temporarily stores them in the target cells 431-435. The connections between an assocaite cell and one or more sensory cells need not be deterministic. These connections can be random. The number of associative cells define the length of the bit string.

The neural network includes threshold knobs 421-425 that adjust the threshold values of the associative cells. The threshold knobs allows one to calibrate a figurative resolution or sensitivity of the neural network so that the neural network produces a finite number of responses to its input. That is, the threshold knobs allow one to ensure that the neural network produces only a finite number of representations of wind patterns in response to receiving a large number of delta winds. The mentioned calibration of the neural network can be performed during a training phase. Calibration includes providing the neural network with training data, which includes wind patterns and energy outputs of the wind farm recorded over a period of one year. Calibration also includes adjusting the threshold knobs of the neural network so that the neural network produces a finite number of representations of wind patterns in response to receiving the wind patterns of the training data. Proper calibration reduces the probability that there is a wind pattern from which the neural network cannot derive into one of the bit strings in the data base. Periodic calibration may be needed after the training period.

Categorical Classification

The system 300 categorizes wind patterns because forecasting is greatly simplified by matching a current wind pattern with one of eight categories of wind patterns. Within each category there are a set of wind patterns for a given energy output. These categories are defined as follows.

Category 1, the cut-in category, describes wind speeds below 4 meter per second. At such wind speeds, no power is produced and small changes in wind speed have little or no effect on power produced from the wind farm. The mentioned rules of this category thus usually produce representations that the system uses to represent many wind patterns.

Category 2, the cut-in to rated category, describes wind speeds above 4 meters per second and below 15 meters per second. At such wind speeds, even small changes in wind speeds result in significant changes in energy output. The rules in this category thus produce representations that the system uses for few wind patterns. That is, there are many representations of wind patterns in this category.

Category 3, the rated category, describes wind speeds above 15 meters per second and below 25 meters per second. At such wind speeds, variations in wind speeds do not change the power output from an individual turbine. However, over an entire wind farm the margins of this domain have very significant variations in the energy output with small variations in wind speed because of the spatial variation of wind over a wind farm.

Category 4, the cut-out category, describes wind speeds above 25 meters per second. At such wind speeds, variations in wind speeds do not affect wind farm output except at the lower margin because the winds are above the operating range of the wind turbines. There are relatively few representations of wind patterns in this category.

Each category is further divided into two sub-categories that allow more resolution in the pattern characterization. Sub-categories represent transition zones of categories. In response to receiving additional input, the neural network adaptively produces representations of wind patterns from which the system can better forecast energy output of the wind farm.

Operation

Figure 5:
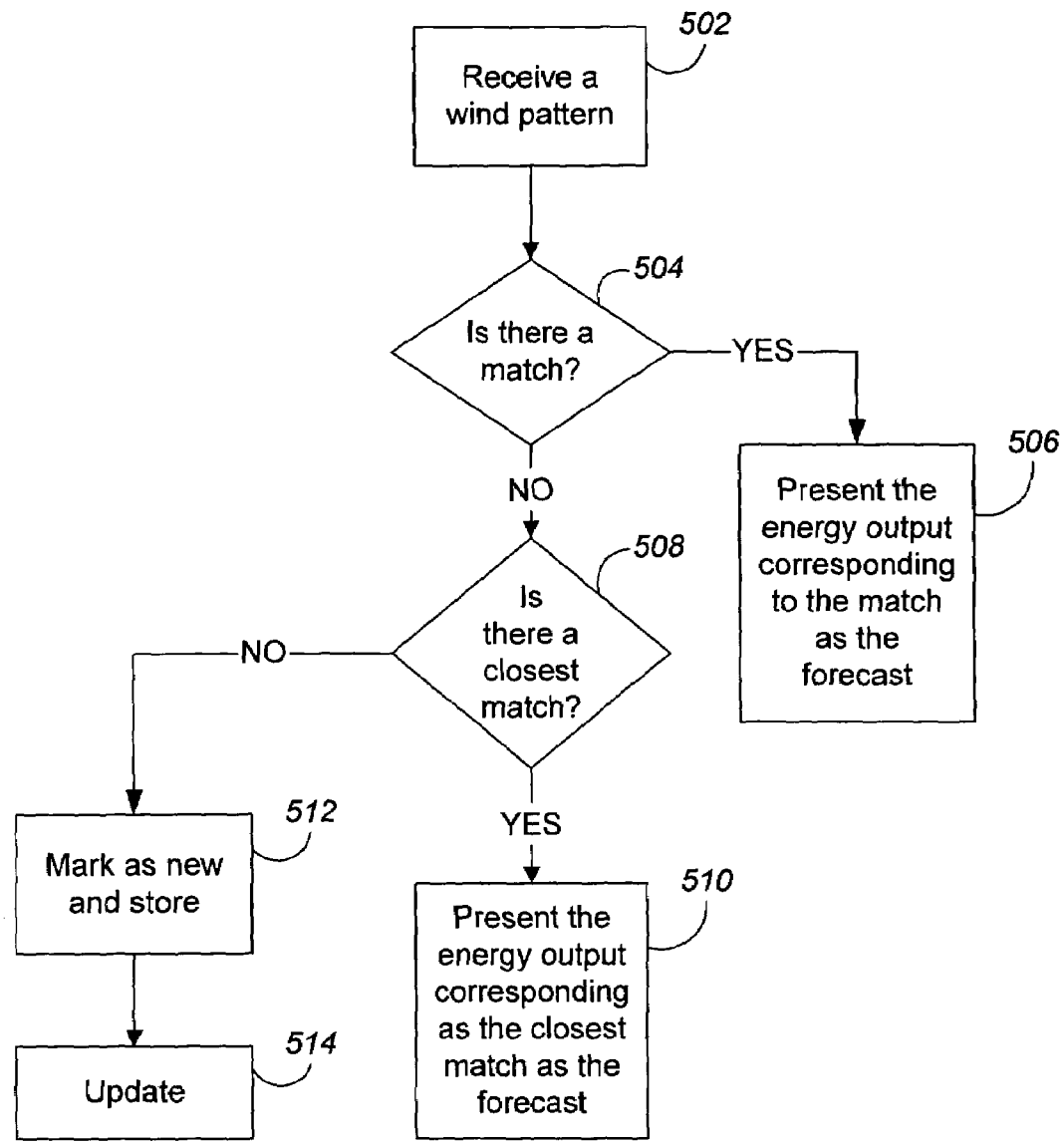
FIG. 5 shows one implementation of a method for forecasting the energy output of a wind farm.

As shown in FIG. 5, the system receives a current wind pattern (step 502) and determines whether there is a matching wind pattern in the database (step 504). If there is a matching wind pattern in the database, the system presents the corresponding energy output value as a forecast energy output (step 506). Otherwise, the system calculates the forecast energy output using turbine performance data and forecast models (step 508). Rules that define a closest match specify acceptable variations where two different wind patterns can be said to be similar. When there is a closest match, the system presents the corresponding energy output of the closest match as the forecast energy output (step 510). Optionally, the system can adjust the forecast energy output to account for differences between the closest match and the current wind pattern. When there is no closest match, the received wind pattern is marked as new and stored in the database (step 512). In this case, the system calculates a forecast energy output using turbine performance data and meteorological forecast models. The system also calculates a probability that the calculated forecast energy output will be accurate. All records marked as new are updated with the actual data once the forecast range has come to actuality and the deviation from the original forecast is recorded (step 514). The system uses Bayesian logic to update the calculated probability. Even when there is a match in the knowledge base, the deviation of actual versus forecasted energy output is recorded in order to fine-tune the system.

Bayesian Logic

The system incorporates Bayesian logic. Bayes inference theorem provides a rule for updating the probability of a hypothesis H, such as the occurrence of a forecasted energy output, given additional evidence E and background information I, such as context information. This rules is shown below.

$$p(H\,|\,E,I) = p(H\,|\,I) * p(E\,|\,H,I) / p(E\,|\,I)$$

As the system's knowledge base grows, i.e., more wind patterns are received, each wind pattern has a probability of a certain outcome or prior probability according to Bayes theory. Any additional evidence, such as additional information received, has its own probability. The combination of the additional evidence plus the prior probability allows one to calculate a posterior probability that is more accurate than the prior probability. The system applies Bayes theorem recursively and, consequently, increases the accuracy of its forecasts and improves the knowledge of the probability of the expected outcome.

Decision Analysis

The system incorporates decision analysis that is based on the assumption that there are alternative actions for any given forecast. For instance, an update to a weather forecast suggests that winds tomorrow will be considerably less than forecasted and energy output will probably not meet previously forecasted levels. A decision maker such as a wind farm operator can revise the energy output forecasted, ignore the weather forecast and not change the energy forecast, or buy additional energy on the spot market to make up the difference in energy output. The described actions are all under control of the decision maker, whereas outcomes or consequences are out of the control of the decision maker. A forecast or action that has a probability and events or consequences that have monetary values are the two necessary ingredients for decision analysis.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are possible. For example, the steps of the invention can be performed in a different order and still achieve desirable results. The system can represent a wind pattern using any format and is not limited to using bit strings. The system can use any number of categories of wind patterns. Furthermore, the wind speeds defining each category of wind patterns can vary depending on the type of wind turbines being used. The sentry point can be a meteorological tower or any station that includes meteorological instruments. A sentry point can be position at any position to allow the system to adapt its forecast. The system can include more than one sentry point. The system is not limited to using Bayesian logic but, rather, can use other logic to improve its accuracy. The system can include any type of neural network. The system can apply any rules in the neural network and not just the described examples. The system is not limited to the described range, relational, and trend test but, rather, can use any test that detects erroneous data.

What is claimed is:

1. A method for forecasting an energy output of a wind farm, the method comprising:
   maintaining a database of wind patterns, each wind pattern being associated with an energy output that the wind farm produces;
   receiving a current wind pattern;
   searching the database for a wind pattern that matches the current wind pattern; and
   calculating a forecast energy output that the wind farm will produce in response to the current wind pattern, the calculation being based, when there is a matching wind pattern in the database, on the energy output associated with the matching wind pattern.

2. The method of claim 1, wherein maintaining a database includes receiving and storing wind patterns and energy outputs, the method further comprising:
   identifying received wind patterns that are erroneous, the identifying being based on one of a range test, a relational test, and a trend test;
   identifying received energy outputs that are erroneous; the identifying being based on one of a range test, a relational test, and a trend test; and
   removing from the database the wind patterns and energy outputs identified as erroneous.

3. The method of claim 1, further comprising:
determining how many wind patterns to associate with each energy output.

4. The method of claim 3, wherein wind patterns in the database are categorized into categories, each category having one energy output that is associated with all wind patterns of the category; the method further comprising:
when there is no wind pattern in the database that matches the current wind pattern, identifying the category to which the current wind pattern belongs and adding the current wind pattern to the database as an additional wind pattern of the category identified.

5. The method of claim 3, wherein a neural network determines how many wind patterns to associate with each energy output, the method further comprising:
adjusting the neural network to change a resolution at which the neural network can distinguish different wind patterns, the resolution determining whether the current wind pattern matches with one of the wind patterns in the database.

6. The method of claim 5, wherein:
the neural network is a variation of the Perceptron, the variation including threshold knobs that determines the resolution; and
adjusting the neural networks includes adjusting the threshold knobs.

7. The method of claim 5, further comprising:
receiving an actual energy output the wind farm produces in response to the current wind pattern, wherein the adjusting is based on the actual energy output.

8. The method of claim 7, wherein:
adjusting includes applying Bayesian logic.

9. The method of claim 1, further comprising:
receiving an actual energy output the wind farm produces in response to the current wind pattern; and
updating a probability that the wind farm will produce the forecast energy output.

10. The method of claim 9, wherein:
updating includes applying Bayesian logic.

11. The method of claim 1, further comprising:
receiving information from an upwind sentry;
detecting a trend from the received information;
updating the current wind pattern based on the trend; and
searching the database for a wind pattern that matches the updated current wind pattern.

12. The method of claim 1, further comprising:
when there is no wind pattern in the database that matches the current wind pattern, identifying a wind pattern that is closest to matching the current wind pattern, wherein the calculation of forecast energy output is based on the energy output associated with the wind pattern identified as being closest to matching the current wind pattern.

13. A computer program product, tangibly stored on machine-readable medium, for forecasting an energy output of a wind farm, the product includes instructions operable to cause a processor to:
maintain a database of wind patterns, each wind pattern associated with an energy output that the wind farm produces;
receive a current wind pattern;
search the database for a wind pattern that matches the current wind pattern;
calculate a forecast energy output that the wind farm will produce in response to the current wind pattern, the calculation being based, when there is a matching wind pattern in the database, on the energy output associated with the matching wind pattern.

14. A system for forecasting an energy output of a wind farm, comprising:
instruments operable to measure a current wind pattern over a wind farm;
a neural network having a knowledge base of wind patterns and energy outputs, each wind pattern being associated with one energy output; and
a network operable to send the current wind pattern to the neural network, wherein the neural network is operable to identify a wind pattern in the knowledge base that matches the current wind pattern and, furthermore, calculate a forecast energy output using the energy output associated with the wind pattern that matches the current wind pattern.

15. The system of claim 14, further comprising:
instruments operable to measure the energy output the wind farm actually produces in response to the current wind pattern, wherein the network is operable to send the measured energy output to the neural network, and wherein the neural network is operable to adjust, based on the energy output the wind farm actually produces, a probability that the forecast energy output is the same as the energy output that the wind farm actually produces.

16. The system of claim 14, wherein:
the knowledge base is a variation of the Perceptron.

* * * * *